United States Patent [19]
Mandel

[11] 3,959,199
[45] May 25, 1976

[54] PLASTIC VARNISH COATING WITH INTEGRAL SELF-PROTECTING FORMULATION AND PROCESS FOR PRODUCING THE SAME

[76] Inventor: Carlos Dubinovsky Mandel, Cerrada Ceylan 529 "F", Mexico City, Mexico, 15

[22] Filed: Oct. 24, 1973

[21] Appl. No.: 409,187

[30] Foreign Application Priority Data
Sept. 24, 1973 Mexico .......................... 146350

[52] U.S. Cl. .......................................... 260/28.5 R
[51] Int. Cl.² ......................................... C08L 91/08
[58] Field of Search .............................. 260/28.5 R

[56] References Cited
UNITED STATES PATENTS

| | | | |
|---|---|---|---|
| 2,845,398 | 7/1958 | Brown | 260/28.5 R |
| 3,553,123 | 1/1971 | Behnke | 260/28.5 R |
| 3,554,790 | 1/1971 | Gehman | 260/28.5 R |
| 3,793,275 | 2/1974 | Corey | 260/28.5 R |

*Primary Examiner*—Paul R. Michl
*Attorney, Agent, or Firm*—Finnegan, Henderson, Farabow & Garrett

[57] ABSTRACT

An outdoor coating based on a water-thinnable plastic varnish, which is hydrophobic when dried, and comprising, in combination a self-protecting emulsion basically comprised by waxes and paraffins, and a compound mainly constituted by acrylic dispersions and vinyl chloride polymer acetates, and also includes a process for producing the same.

1 Claim, No Drawings

PLASTIC VARNISH COATING WITH INTEGRAL SELF-PROTECTING FORMULATION AND PROCESS FOR PRODUCING THE SAME

BACKGROUND OF THE INVENTION a. Field of the Invention

This invention relates to the protecting coatings or linings manufacturing industry, and more particularly relates to the industry specialized in the manufacture of water-proof protective coatings and weather-proof linings, useful for protecting several construction elements such as wood, bricks, cement, mortar, plaster, tiles, etc., but said elements also can be used with objects such as clay, paper, paperboard, etc., as ornamental and also protecting coverings.

b. Description of the Prior Art

It has been a main goal of the manufacturers of protecting products for those surfaces exposed to weather, the attainment of a type of coating which, further to provide a positive aesthetic appearance, is of great resistance and proved long-term life.

Some enamels or paints based on varnish have been known which are manufactured by mixing fine pigments and using said varnish as a carrier.

There is also a type of enamel capable of becoming dry quickly, and prepared with a varnish based on a synthetic resin. Said present enamels dry in a short time of from 2 to 4 hours, compared with the experience of some years ago, when said paints were made with oil or natural resin varnishes. There is also an enamel flat upon drying, and manufactured in the same way as those glossy enamels, with the only difference that a less fine pigment is employed, with a smaller proportion of varnish and a greater amount of volatil solvent as with said common enamel. However, this type of paints or flat coatings, due to their pleasant decorative effects, are employed indoors but they are wholly unsuitable for outdoors applications.

There are also a range of protecting coatings which are manufactured having in mind a concrete application thereof. Thus, several materials are known, particularly anticorrosive compounds and specially antiscale compounds, including the so-called marine-type varnishes, the practical application of which is positively outdoors.

However, it is broadly known by those skilled in the art that those usual varnishes, in a solvent-based solution, lack of yieldability, generally forming rigid films of a crystaline type, hard, brittle and without pores preventing thus the necessary gaseous interchange between atmosphere and the coated materials.

These characteristics result in the application of said type of varnishes to be negative due to the fact that, in a limited period of time fail upon exposition to humidity and sun radiation, and specially when applied on non-dimensionally stable substracts, such as wood.

In fact, wood is one of those materials which have presently greater application in the finishing of outdoors surfaces, due to its great aesthetic possibilities, but having, however, a main drawback consisting in the easy deterioration thereof due to eroding agents.

The glossy finishing of wood used in outdoor applications, is not the most suitable due to its few aesthetics and due to this, the skilled in the art have been seeking for a type of coating having a flat appearance for outdoor application.

As above stated, said flat varnish is not suitable for outdoors application, since for this effect substances producing flat effects should be incorporated therein, such as silicic acid or opaque charges, such as talcum, some carbonates, barium sulfate, diatomaceous earths, etc., thus adversedly affecting the life of said films since their humidity absorption is considerably increased, thus impairing the application thereof for outdoors finishings.

In the field of modern organic chemistry there is an active search for hydrophobic plastic aqueous dispersions which, in spite of its capacity of being diluted with water, when the film formed by said compounds is dry, becomes water-insoluble and posesses an extraordinary repelency thereto.

It also has been experimented with the so-called "large" varnishes or high-oil varnishes which due to their great content of this latter product, are more elastic than "short" or low-oil varnishes and, therefore, are more resistant to natural eroding agents.

However, there is no notice that a product based on a water-dilutable plastic varnish has been manufactured up to the date of this application, which becomes hydrophobic when dry and also a semi-glossy or flat-product, with long-lasting characteristics to weather and having the possibility of being colored and grained upon passing a brush thereon from one end to the other, thus obtaining a wood-like effect.

This attainment is in contrast with the troublesome treatment of the prior art employed to improve the appearance of wood, color the same and produce a sort of graining of high-quality wood, such as, for instance, oak graining which required of a delicate labor by the painter with high specialization and, furthermore, of some danger.

The process used in the prior art consisted in scratching the wood with a special tool, followed by a dying with water anilines, which was protected with a couple of passes of gasoline-fused virgin wax.

The drawbacks of said complicated and time-consuming process are apparent: short life of the dying, since said anilines are not resistant to sun-light; sticky hand of said wax in warm temperatures; loosening thereof due to the action of water; damage of the gloss in short time and great inflamation danger by said wax-gasoline mixture. A finishing hand of varnish based on a solvent did not improve substantially the results.

SUMMARY OF THE INVENTION

Thus, it is the main object of this invention to formulate a film with an extraordinary long-life in weather variable conditions, and useful as a decorative element modifying the appearance and natural texture of wood or any other material, stressing the vein or grain thereof, and providing a broad coloring which is resistant even to UV rays and, therefore, to decoloration.

It is another object of this invention to manufacture a protecting coating which, when dried, forms at the surface thereof a layer resistant to eroding agents and which, due to its markedly hydrophobic characteristics, is rain-and water-repelent in any of the forms thereof, thus preventing the excessive moistening of wood.

Another further object of this invention is to provide a water-dilutable plastic varnish capable of forming a dry base, an elastic semi-glossy transparent layer or film which is highly water-repellent, so as said plastic binding base is not cracked or detached. These facts, together with the low humidity absorption capacity prevents the deterioration of the constitutive elements thereof, or the pass of said humidity to said substract, which often resulted in formation of alkaline salts known as saltpeter which produce the final dettachement of the usually applied films.

Still another object of this invention is to provide a protecting film for outdoor surfaces, employing a binding based on plastic dispersions, providing for a gaseous interchange between the substract of the application zone and the outer atmosphere, thus allowing for the moist of the materials to be dryed through the pores of said protecting film, without affecting adversedly the adherence thereof.

It is also another object of this invention to provide a water-dilutable plastic varnish, which is hydrophobic when dry, naturally flat, useful to stress the positive aesthetics in indoors and also of long life and high resistant to weather, without the need of incorporating flat-effect producing materials or fillers.

It is still a further object of the invention to provide a water-dilutable plastic varnish, hydrophobic when dry, capable of forming a fast-drying painting through the addition of pigments and low-water absorption charges, with aqueous dilution and silky hand, completely washable and with water repellency and aqueous stain repelent; being characterized also in that by increasing the amount of the charge to said plastic varnish, a paste-like mixture useful for patching and pointing of cracks, holes, nail heads, as well as for relief decorative works in outdoors or movable articles for indoors. Said paste, added with color pigments complements the function of the aqueous-dispersion varnishes also colored since the coating obtained thereby on the patching and pointing by means of the paste-like mixture produces a varnished patching which, for the eveness thereof does not seem such patching and pointing.

There is also a further object of the invention in the application thereof as seals for paper and the derivatives thereof, due to its highly bactericide character, thus permitting the employment thereof in containers of said materials, intended to contain foodstuffs or in surfaces wherein the fungi and bacteriz growth are to be prevented.

These and other further objects of this invention can be infered from the analysis of the following specification and examples, by those skilled in the art.

DESCRIPTION OF THE PREFERRED EMBODIMENTS

The binding portion is constituted by plastic dispersions in an aqueous medium, such as polyvinyl acetate or acrylics and combinations thereof, or copolymers of said products with other products providing different degrees of elasticity without the use of plastifiers capable of migrate. The inclusion of non-plastified hard products with inner-plastified soft products, modifies the hardness of conventional inner films, thus preventing the cracking thereof when applied in outdoors. Thus, the resilience or elasticity obtained from said plastic dispersions of this invention allows the application thereof to wood, accompanying the same in its expansion and contraction motions without affecting its original structure.

This composition includes a self-protecting composition formed by a synergistic combination of several types of waxes and paraffines formed in an emulsion to provide said product with a satin hand and protecting the same against ageing, providing a flat appearance and a notorious repellency to water and stains.

The waxes useful in this invention are selected from synthetic wax (DG or LGE wax, B.A.S.F.), micro-crystalline wax (Mobilwax, Mobil Oil Co.). DG waxes are ester waxes based on bleached and modified montan waxes. LGE waxes are ester waxes based on bleached and modified montan waxes combined with an emulsifying non-ionagen system. The paraffin employed is a reffined white paste with small content of oil and having a melting point of from 50° to 62°C., there being used as emulsifier an oleic acid saponified by an amine (preferably morpholine due to the volatile character thereof which forms a non re-emulsionable film upon drying thereof).

FORMULATION FOR THE SELF-PROTECTING EMULSION

| | Parts by weight |
|---|---|
| DG or LGE wax | 20 |
| Mobilwax | 12 |
| Paraffin (paste) | 6 |
| Oleic acid | 8 |
| Morpholine | 3 |
| Water | 51 |
| Total | 100 |

The self-protecting emulsion of the above formulation can be manufactured by using several processes; there being pointed out, only for illustrative purposes, the following exemplified process:

EXAMPLE 1 a. The synthetic wax, the micro-cristalline wax, the paraffin and the fatty acid are melted to a temperature of 95°C. in a heated double-walled container.

b. The amine is slowly added, with constant stirring.

c. Water is heated to its boiling point, and is incorporated to the other melted products, slowly, in order to form a uniform emulsion.

d. Stirring is continued more slowly until the temperature does down to the room temperature.

The protecting emulsion, the formulation and process of manufacture of which are given above, is added to another base formulation called end base product, the formulation of which is as follows:

(The pointed out ratios can vary to achieve different types of hardness desired).

| | |
|---|---|
| "Mowilith" (Polyvinyl acetate, Hoescht* | 55 to 90 Kgs. |
| Acrylic dispersions (Rohm and Haas, BASF) | — |
| Diacetonic alcohol (water-soluble solvent) | 4.150 Kg. |
| "Preventol CMK" Bayer (chloro-m-cresol as a disinfectant | 0.200 Kg. |
| Ethylenglycol (water retainer) | 5.300 Lts. |
| Ammonia 25°Be (alkalinizer) | 1.500 Lts. |
| Nopco NDW, Nopco Industrial (fatty acid esters for Antifoaming) | 0.800 Lts. |
| "Thilose 12.000 K", Hoescht (methyl cellulose 12.000 centipoises in a 2% water dispersion as a thickener) (in aqueous solution, 3%) | |
| Precipitated calcium carbonate (neutralizer) | 0.550 Kg. |
| Water | 0.700 Lts. |

*Acrylic dispersions as used in Example 1 and throughout the specification refers to anion active water dispersions of an acrylic acid ester copolymer.

Said self-protecting emulsion is admixed with said base formulation, in a ratio of from 10 to 45 kgs. as the final step to obtain the end product.

In order to specify the process of manufacture of said base product, as well as the formulation of the end product, obtained through the addition of said self-protecting emulsion, the following example is given.

EXAMPLE 2

In admixing tanks the required amount of plastic dispersions are introduced; while in another container the alcohol diacetone and Preventol GMK priorly dissolved therein as well as ethyleneglycol and ammonia are stirred and in a fine and continuous stream are added to said plastic dispersion, in a stirred state by means of a Cowles-Dissolver or other similar apparatus, at a speed of about 1800 rpm. When the above described addition is ended, said antifoaming is added, as well as the thickener solution and said precipitated calcium carbonate, mixed in said water.

Stirring is continued during 10 more minutes and said self-protecting emulsion is added.

When the above formulation is completed, stirring is continued but just to 1200 rpm. for 20 minutes until an homogeneous product is obtained with mean viscosity and silky hand.

When a varnish with additional pigments is desired, in this point the previously prepared dispersions of said pigment are added, containing minimum amounts of moisteners and dispersants in order to prevent the labor of said selfprotecting emulsion to become overcomed; as the end step of this example, said finished product is strained and packed.

It is to be pointed out that the structural characteristics of the product of the formulation hereinabove described, are such that when a brush with said product in colored form is passed on a surface previously painted with a product of this invention wherein pigments and charges as disclosed have been added, an attractive decorative application is obtained, consisting in the colored graining due to the different concentration of the brush hair when passes from one end to the other.

Said graining resambles intimately to that of the wood, and are an economical substitute therefor when applied directly to gypsum walls, refined cement walls, or on paper or cardboard, as well as on vinylic or acrylic paints.

Of course, upon variation in the motion imparted to the brush, different visual effects can be obtained on the treated surface, such as waves, zig-zag, tassels, etc. A second passing of the brush in a cross direction onto the already dried graining, produces an open-waving effect.

These decorative capabilities are obtained due to the transparency and color characteristics of the product, as well as to its body, impairing for the graining to extend and disappear when dry, there being obtained, through this process, to positively change the aesthetics of wood and other constructive elements, in a non-expensive way.

Compounds prepared according to processes and formulations as given above, have been subjected to some laboratory tests among which they can be cited those effected for the measurement of impermeability and bactericidal and fungicidal activities, as cited hereinbelow together with the respective results, in order to demonstrate said characteristics.

REPORT FROM CHILEAN UNIVERSITY INSTITUTE OF PHARMACOLOGICAL RESEARCH AND ASSAYS

Report No. 1

Papers, paperboards and cardboards were subjected to impermeability test as recommended by Berl Lunge D'Ans.

| (Filtration): | |
|---|---|
| Impregnated letter-type paper | 15 days |
| Non-impregnated letter-type paper | 48 hours |
| Gray paper impregnated | More than 28 days |
| Non-impregnated Gray papel | 3 minutes |
| Impregnated paperboard | More than 28 days |
| Non-impregnated paperboard | 10 days |

CONCLUSION: "Papers and paperboard resist well. Cardboards also resist well, but they cannot be bent as their resistance diminishes upon cracking".

All these products prevent the pass therethrough into the substract of foodstoofs and ice, making easy the off-molding and maintaining the package appearance.

Undesirable substances cannot pass upon dissolution of cardboard into the foodstoof, whereby said product film constitutes an efficient barrier from the sanitary point of view and having the further advantage on common paraffincoated products, of its resilience and bending-resistance.

Likewise, fungi and bacteria cannot growth on the treated surfaces, as appears from the following report.

Report No. 2  Tests "Halo" System In Plate.

a. Test against Staphylococcus aureus

An assay was made with each of papers and paperboards impregnated. There is a partial inhibition of bacterian growth in contact zone. There is no diffusion nor bacterial action of the antiseptic substance on said seed.

b. Test against Salmonella Typhi

This test was made on each of the papers and cardboards impregnated.

There is a partial inhibition on bacterial gowth at the contact zone, except on thin white paper (letter paper) which offers a whole inhibition of the bacterial growth at the contact zone. There is no diffusion of said antiseptic.

An equivalent test effected on papers non-impregnated, gives plenty of seed growth, inclusive at the contact zone. There is also saprophytes growth at the edge of the paper.

The elemental proportion of the compounds entering into the above disclosed formulations, have been included merely as illustrative examples; therefore, said proportions can be varied without affecting the inventive concept of the above disclosed composition and process.

I claim:

1. A plastic weather resistant outdoor varnish coating with integral self-protecting formulation consisting of from about 55 to 90% by weight of an aqueous dispersion of a plastic varnish, selected from the group consisting of homopolymers or copolymers of polyvinyl acetate, and from about 10 to 45% by weight of an emulsion containing about 20% of a synthetic wax, about 12% of a micro-crystalline wax, about 6% paraffin, about 8% oleic acid, about 3% morpholine, suitable amounts of diacetonic alcohol, a disinfectant, ethyleneglycol, ammonia, an antifoaming agent, a thickening agent, calcium carbonate as a neutralizer, and the balance water.

* * * * *